United States Patent
Edinger et al.

(10) Patent No.: US 10,670,710 B2
(45) Date of Patent: Jun. 2, 2020

(54) HIGH EFFICIENCY SYNTHETIC APERTURE RADAR SATELLITE

(71) Applicant: Ursa Space Systems, Inc., Ithaca, NY (US)

(72) Inventors: Derek Edinger, Ithaca, NY (US); Evan Kurtz, Dryden, NY (US); Hailee Hettrick, Cambridge, MA (US)

(73) Assignee: URSA SPACE SYSTEMS, INC., Ithaca, NY (US)

( * ) Notice: Subject to any disclaimer, the term of this patent is extended or adjusted under 35 U.S.C. 154(b) by 254 days.

(21) Appl. No.: 15/832,687

(22) Filed: Dec. 5, 2017

(65) Prior Publication Data

US 2019/0025422 A1 Jan. 24, 2019

Related U.S. Application Data

(60) Provisional application No. 62/430,449, filed on Dec. 6, 2016.

(51) Int. Cl.
*G01S 13/90* (2006.01)
*H01Q 15/16* (2006.01)
(Continued)

(52) U.S. Cl.
CPC ............ *G01S 13/90* (2013.01); *B64G 1/1021* (2013.01); *G01S 7/282* (2013.01); *G01S 7/295* (2013.01);
(Continued)

(58) Field of Classification Search
CPC ...... H01Q 15/162; H01Q 1/288; H01Q 13/02; H01Q 19/132; H01Q 19/19; H01Q 15/161;
(Continued)

(56) References Cited

U.S. PATENT DOCUMENTS 3,503,072 A * 3/1970 Thompson ............... B64G 1/22
343/705
5,122,805 A 6/1992 Peterman
(Continued)

OTHER PUBLICATIONS

Cantafio. Space-Based Radar Systems and Technology. 1990. [retrieved on Mar. 20, 2018]. Retrieved from the Internet:<URL: http://helitavia.comwww.helitavia.com/skolnik/Skolnik_chapter _22.pdf >. entire document.
(Continued)

*Primary Examiner* — Olumide Ajibade Akonai
(74) *Attorney, Agent, or Firm* — Hogan Lovells US LLP (57) ABSTRACT

Systems and methods in accordance with various embodiments of the present disclosure provide high efficiency synthetic aperture radar satellite designs that achieve higher power efficiency and higher antenna aperture size to satellite mass ratios than the current state of the art. In various embodiments, a high efficiency synthetic aperture radar satellite includes a satellite bus and a parabolic reflector antenna coupled to the satellite bus. The satellite system may further include a traveling wave tube amplifier configured to drive the parabolic reflector antenna, and a body-mounted steering system configured to mechanically steer the satellite system to direct the parabolic reflector antenna. The satellite system may further include a processor configured to combine the pulse reflections and generate image data representing the region of interest, in which the image data is effectively obtained with a synthetic aperture greater than the actual antenna aperture.

20 Claims, 9 Drawing Sheets

(51) Int. Cl.
  *H01Q 19/12* (2006.01)
  *B64G 1/10* (2006.01)
  *G01S 7/282* (2006.01)
  *G01S 7/295* (2006.01)
  *G01S 13/42* (2006.01)
  *H01Q 1/28* (2006.01)
  *H01Q 13/02* (2006.01)

(52) U.S. Cl.
  CPC ........... *H01Q 15/161* (2013.01); *H01Q 19/12* (2013.01); *B64G 2001/1035* (2013.01); *B64G 2700/66* (2013.01); *G01S 13/426* (2013.01); *H01Q 1/288* (2013.01); *H01Q 13/0258* (2013.01)

(58) Field of Classification Search
  CPC .. H01Q 13/0258; H01Q 19/12; B64G 1/1021; B64G 2001/1035; B64G 1/1007; B64G 2700/66; F24S 2025/012; F24S 20/50; G01S 13/426; G01S 13/90; G01S 7/282; G01S 7/295
  See application file for complete search history.

(56) References Cited

U.S. PATENT DOCUMENTS

| | | | |
|---|---|---|---|
| 6,016,999 A * | 1/2000 | Simpson | B64G 1/1007 244/159.5 |
| 6,184,825 B1 | 2/2001 | Wehner | |
| 7,129,901 B2 * | 10/2006 | Tietjen | H01Q 3/08 343/757 |
| 2003/0203733 A1 * | 10/2003 | Sharon | H01Q 1/288 455/427 |
| 2008/0084357 A1 | 4/2008 | Smeltzer | |
| 2009/0295625 A1 * | 12/2009 | Voelker | B64G 1/1021 342/25 A |
| 2010/0086228 A1 | 4/2010 | Cho | |
| 2012/0069918 A1 | 3/2012 | Chang | |
| 2012/0235869 A1 | 9/2012 | Allen | |
| 2016/0352022 A1 * | 12/2016 | Thomson | H01Q 19/19 |
| 2017/0012492 A1 * | 1/2017 | Bandera | H02K 41/031 |
| 2017/0219347 A1 * | 8/2017 | Veto | B64G 1/286 |
| 2018/0139508 A1 * | 5/2018 | Norin | H04N 21/8126 |

OTHER PUBLICATIONS

Schroder et al. The Mapsar Mission: Objectives, Design and Status. 2006. [retrieved on Mar. 20, 2018]. Retrieved from the Internet:<URL: http://elib.dlr.de/43957/1/EUSAR_2006_MAPSAR_paper.pdf>. entire document.

Williams et al. High-Capacity Communications From Martian Distances. 2007. [retrieved on Mar. 20, 2018]. Retrieved from the Internet:<URL:htlps://ntrs.nasa.gov/archive/nasa/casi.ntrs.nasa.gov/20080012561.pdf >. entire document.

International Search Report and Written Opinion issued in PCT Application No. PCT/US17/64950 dated Apr. 18, 2018.

International Preliminary Report on Patentability issued in PCT Application No. PCT/US17/64950 dated Jun. 11, 2019.

* cited by examiner

HIGH EFFICIENCY SYNTHETIC APERTURE RADAR SATELLITE

CROSS-REFERENCES TO RELATED APPLICATIONS

This application is a continuation of Provisional Patent Application No. 62/430,449, entitled "HIGH EFFICIENCY SYNTHETIC APERTURE RADAR SATELLITE," filed Dec. 6, 2016; of which the full disclosure of this application is incorporated herein by reference for all purposes.

BACKGROUND

There are increasing applications that require high quality radar satellite imaging. However, obtaining high quality radar satellite images typically requires a large antenna aperture, which is generally a function of antenna size. Synthetic aperture radar (SAR) is a side-looking system that is able to utilize a small physical aperture to simulate a larger synthetic aperture by moving the radar along a flight path while emitting pulses. The reflections of the pulses are digitally processed and combined to generate image data. Synthetic aperture radar also has the capability to perform imaging at night and through clouds since it does not require solar illumination. However, current synthetic aperture radar technology has shortcomings that limit its applicability. For example, currently, large and costly phased array radars are used as synthetic aperture radar payloads on satellites for Earth observation because of their operational mode flexibility. Generally, there is a cost to image quality tradeoff that occurs. Cost and image quality are both functions of the technological design of the satellite, among other factors. Many potential applications of synthetic aperture radar technology have not been possible due to the cost to image quality constraints of the state of the art.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches for satellite imaging. In particular, various embodiments provide high efficiency synthetic aperture radar satellite designs that achieve higher power efficiency and higher antenna aperture size to satellite mass ratios than the current state of the art.

In various embodiments, a high efficiency synthetic aperture radar satellite includes a satellite bus and a parabolic reflector antenna coupled to the satellite bus, in which the parabolic reflector antenna includes a central hub and a plurality of antenna ribs movable from a stowed position to an operational position. The antenna ribs may be foldable around the central hub in the stowed position and expandable into a parabolic reflector configuration in the operational position. The antenna is configured to transmit a series of pulses from different positions over a region of interest and receive a corresponding series of pulse reflections, in a synthetic aperture radar imaging fashion. The satellite system may further include a traveling wave tube amplifier configured to drive the parabolic reflector antenna, and a body-mounted steering system configured to mechanically steer the satellite system to direct the parabolic reflector antenna. The satellite system may further include a processor configured to combine the pulse reflections and generate image data representing the region of interest, in which the image data is effectively obtained with a synthetic aperture greater than the actual antenna aperture.

Various other features and application can be implemented based on, and thus practice, the above described technology and presently disclosed techniques. Accordingly, approaches in accordance with various embodiments drastically improve the efficiency of synthetic aperture radar satellites, which can enable a myriad of technologies and applications that were previously not possible due to efficiency constraints of the state of the art. Specifically, as discussed above, at least one technological hurdle which had to be overcome is the efficiency tradeoffs. Specifically, in order to increase the imaging quality of a radar satellite, the cost becomes high, such as costs associated with building the satellite, launching the satellite, and other manufacturing and operational costs. Conversely, cutting costs generally requires design decisions that decrease image quality. This cost to quality tradeoff is further complicated by the numerous design variables of radar satellite design, and particularly the additional constraints of a synthetic aperture radar design. Thus, the satellite system architecture of the present disclosure required creative design as well as meticulous experimentation so as to be able to perform outside of the traditional constraints of radar satellite design and achieve a level of efficiency that is not seen in the state of the art. Various other applications, processes, and uses are presented below with respect to the various embodiments, each of which improves the operation and performance of the computing device(s) on which they are implemented.

Figure 1:
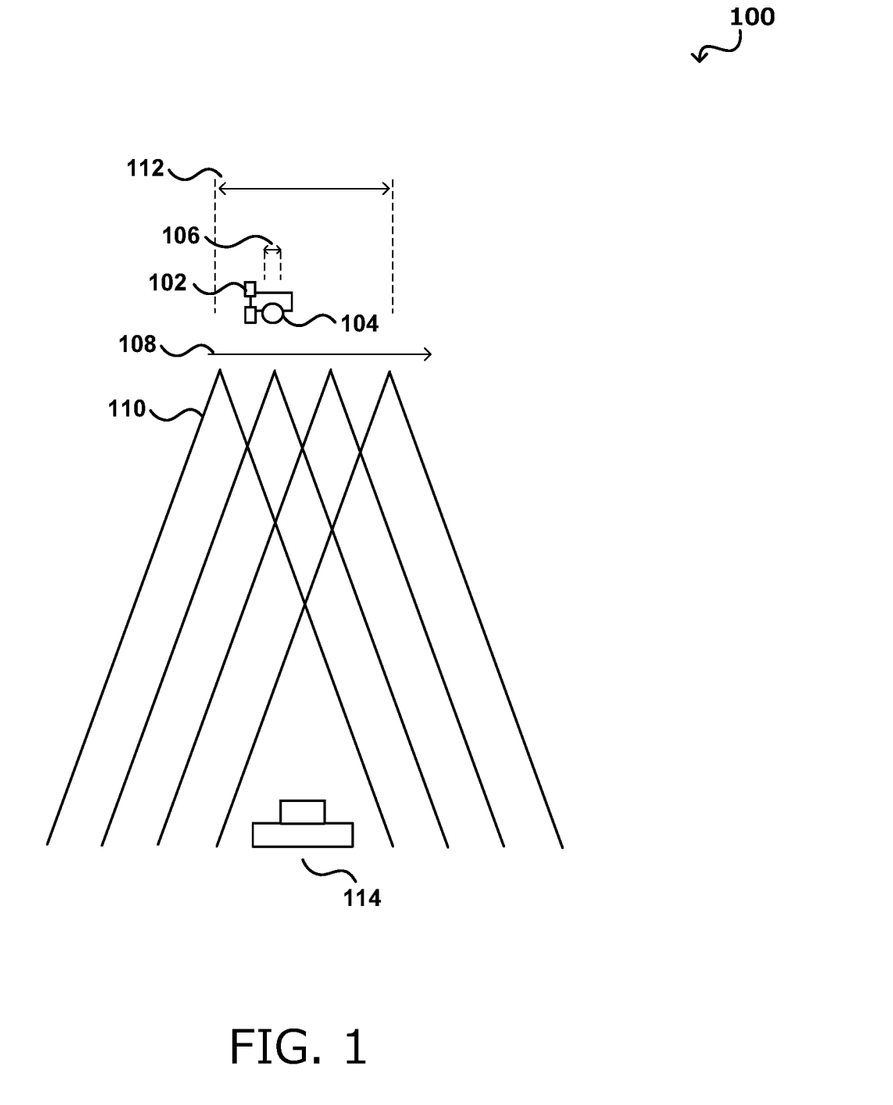
FIG. 1 illustrates an example representation of synthetic aperture radar imaging, in accordance with various embodiments of the present disclosure.

FIG. 1 illustrates an example representation of a synthetic aperture radar (SAR) imaging system 100. In various embodiments, synthetic aperture radar imaging utilizes a radar assembly 102 which may be carried on a satellite or other aircraft. The radar assembly in this example 102 includes an antenna 104 that has a certain antenna aperture 106. In traditional radar-based imaging, obtaining high quality images may require a large antenna aperture, which is generally a function of antenna size and/or power. However, synthetic aperture radar is a side-looking system that is able to utilize a small physical aperture 106 to simulate a larger synthetic aperture 112 by moving the radar 102 along a flight path 108 while emitting radio-frequency pulses 110 that reach a targeted region of interest. Due to the movement, the emitted pulses that reach the region of interest 114 are emitted across a wide area, or a synthetic aperture 112, thus simulating an antenna having such a wide aperture while the antenna's actual aperture 106 is much smaller. Reflections of the emitted pulses are received by the radar 102 and digitally processed, in which the reflection signals are combined to generate image data of the region of interest. Otherwise, an antenna having an actual aperture of comparable size and capable of generating images of comparable quality would be much more resource intensive.

Conventional synthetic aperture radar satellite are designed toward maximizing performance, flexibility, and capability, without much consideration towards cost constraints, as present applications of synthetic aperture radar are largely government funded large scale operations. However, such systems cannot be used for applications in which cost is a limiting factor, thus presenting major shortcoming in the state of the art. Specifically, the cost of manufacturing and operating such a satellite is a function of its technological architecture and engineering design. That is to say, current synthetic aperture radar satellite technology does not achieve a level of efficiency needed to enable a myriad of applications, as it has been limited by resource and performance tradeoffs, examples of which are further described below.

Various embodiments of the present disclosure provide advances in synthetic aperture radar satellite technology that achieve higher efficiencies that the state of the art, including higher signal-to-noise ratio (SNR) to launch energy ratio, and effective aperture area to mass ratio. Specifically, the synthetic aperture radar satellites described herein may be capable of achieving a power aperture factor to cost ratio of at least 0.50 kilowatt-square meters per dollar, and an antenna aperture size to mass ratio of 10 square meters per kilogram.

In various embodiments, the satellite includes a bus and a payload. The bus provides the ability for the satellite to be launched and maintained in orbit while keeping the satellite alive and communicating with Earth as it performs its mission. The bus houses several subsystems of the satellite, such as the structure, attitude control, power, telemetry and command, data handling, among others. The payload includes the systems for carrying out the specific functions of the satellite. In the present application, the payload includes an antenna and other radar electronics that provide ability to produce radar images and data.

As described above, the system architecture for synthetic aperture radar satellite technology of the present disclosure is designed towards efficiency. This is in part because resources (e.g., physical space, mass, power, etc.) on a satellite operating in space are scarce and associated with significant costs. Denoting this as a guiding metric for the satellite design, it is determined that a derived metric of efficiency for an earth observation satellite is signal-to-noise ratio (SNR) normalized by cost. SNR compares the level of a desired signal to the level of background noise. A high SNR indicates that the power of a signal (the desired information) is greater than the power of the background noise, meaning that more details the user cares about are evident. This can be achieved by limiting noise or increasing the signal. An increased signal can be achieved by increasing aperture size and/or increasing transmitted power. Aperture represents the size of the antenna on the satellite and power is the amount of electrical power used by the radar to transmit the signal. The trade space between increasing aperture or increasing power takes into account weight and prime power available on the satellite.

Ultimately, it is determined that it may be more cost effective to increase the aperture size rather than increasing the satellite power to achieve the same SNR. Increasing aperture involves increasing the size of the antenna. Increasing satellite power requires a larger solar array and more batteries which drive up cost, mass, and volume to a greater extent than increasing the size of the antenna. A large aperture can be placed on a large bus (where bus in this context refers to the satellite's body and excludes deployables) and still be efficient. However, a large bus increases the cost of the satellite and launch. The cost of launching a satellite is often estimated to be a function of satellite mass. Thus, aperture area normalized by mass is not essential for optimizing the efficiency metric, but is advantageous in lowering the total cost of the satellite. There are a variety of factors which affect SNR, but the most important are power, aperture size, and radio frequency (RF). This can be simplified into a Power Aperture Factor (PAF) which is proportional to SNR.

$$\frac{PAF}{m} = \frac{PA^2}{\lambda^2 m}$$

where: P=peak radio frequency power (kW)
A=antenna aperture area (m$^2$)
λ=radio frequency wavelength (m)
m=satellite mass (kg)

To express this as efficiency, PAF can be divided by satellite mass. Embodiments described herein provide a unique system architecture which can achieve, for example: i) PAF to satellite mass ratio of 600 kilowatts-meters squared per kilogram or greater; and ii) Antenna aperture size to satellite mass ratio of 0.03 meters squared per kilogram or greater. The present disclosure provides a system architecture that achieves the aforementioned metrics.

Figure 2:
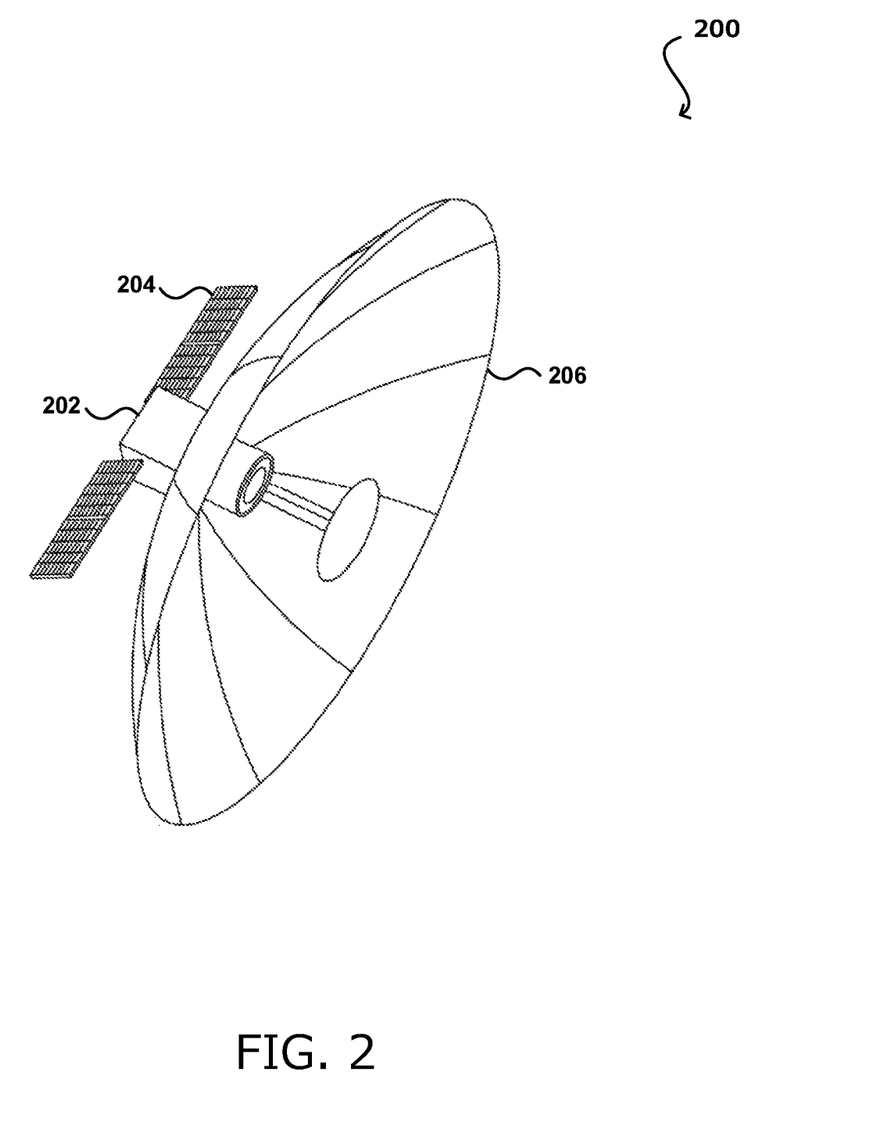
FIG. 2 illustrates an example representation of a satellite for high efficiency synthetic aperture radar imaging, in accordance with various embodiments of the present disclosure.

FIG. 2 illustrates an example representation of a radar satellite 200 for high efficiency synthetic aperture radar imaging, in accordance with various embodiments. As mentioned previously, the satellite 200 includes a bus and a payload. The bus includes various components or subsystems that enable general operation of the satellite, such as attitude control, structure, command and data handling, telemetry and communication. These components may be housed in a satellite body 202 or bus structure. The bus may include solar panels 204 for generating power. The payload may include an antenna 206 and radar electronics that provide the ability for the satellite to produce radar imagery and data. The bus provides several supporting functions in order to allow the payload to operate and to relay its data back to Earth.

The size of the satellite 200 may vary across embodiments, such as satellites up to 10 kg in mass (also known as CubeSats), satellite in the 10-100 kg mass range (also known as micro-sats), to satellites weighing more than 1,000 kg (also known as large-sats). Various embodiments utilize a low earth orbit, meaning an orbit with an altitude between 300-2,000 km, of various inclinations. In an example embodiment, a micro-sat satellite is utilized and operated at an altitude of 500 km. In some embodiments, an altitude of approximately 500 km may be ideal for achieving a high percentage of coverage of the Earth while maintaining good signal to noise ratio (SNR). Such an embodiment of the satellite is illustrated in FIG. 2, which illustrates a few basic components of the satellite, including the solar panels 204, the satellite body 202 which contains various components that make up parts of the bus and/or payload, and the antenna 206. A micro-sat is a cost-efficient choice since cost tends to increase as mass increases. This is at least in part because launch vehicle costs increase significantly for larger launch vehicles. Thus, a satellite in the 10-100 kg mass range may be the smallest size able to support the operational requirements of the high efficiency synthetic aperture radar system of the present disclosure. In some embodiments, a larger satellite may be used, such as up to 150 kg or more. However, in order for such a small satellite class to be feasible, tradeoffs may need to be made to minimize the satellite's mass. Thus, in various embodiments, a parabolic reflector antenna 206 is used rather than a phased array antenna and a mechanical steering system is used to maneuver the antenna rather than an electrical system. As a result, the overall mass and volume of the satellite are kept relatively small while still providing a resolution of at least 1 m and an SNR of at least 20 dB.

In various embodiments, the satellite 200 includes a body-mounted steering system, in which the antenna 206 is pointed by steering the entire satellite. Body-mounted steering can be performed through various ways. Based on the mission requirement of being able to track targets or target regions with the satellite 200, the system architecture may employ an active attitude control via angular momentum actuators and/or force actuators. Such actuators may include thrusters, reaction wheels, and control moment gyroscopes (CMG). Thrusters can utilize chemical or electric propulsion, which result in different amounts of impulse force applied to the satellite to change its angular position. Additionally, other force actuators that can be used include magnetorquers and magnetic coils, which create a magnetic field in order to perturb and thereby move the satellite in a certain manner. Example angular momentum actuators that can be utilized in various embodiments include control moment gyroscopes and reaction wheels. Specifically, control moment gyroscopes and reaction wheels occupy different regions of the momentum-torque trade space, and thus can be selectively utilized based on specific momentum-torque requirements of various embodiments. Although control moment gyroscopes may be more mechanically complex, they offer significantly more torque for a fraction of the power. Such a torque efficiency is an advantage to any satellite with demanding acceleration requirements, such as in embodiments of the high efficiency synthetic aperture radar satellite 200. In various other embodiments, the satellite 200 may utilize an antenna steering system rather than a body-steering system. An antenna steering system directs the antenna by steering the antenna relative to the satellite, which can be accomplished mechanically or electrically. Both body-steering and antenna steering achieve the goal of pointing the antenna.

The design of the antenna 206 is a key aspect of the system architecture in order for the high efficiency synthetic aperture radar satellite 200 to achieve an adequate SNR. Various embodiments of may include different antenna designs and characteristics, examples of which are detailed below. An important parameter of the antenna 206 is gain. Gain is a performance metric of the antenna's electrical efficiency and directivity. In general, high gain is favorable when the direction from where the signal is coming from is known and low gain is better when the direction is not known. For example, for purposes of space borne Earth observation, the satellite 200 is configured to observe specific targets, meaning the signal's direction is known. Thus, high gain is preferable in such applications. In some embodiments, both aperture efficiency and physical aperture area are parameters that contribute to gain in a directly proportional manner.

Various embodiments can include either a parabolic reflector or a phased array (active or passive). A phased array antenna is comprised of a large plurality (e.g., up to hundreds) of individual antenna elements filling the aperture. It is able to electronically scan, generate multiple beams, and cover broad swaths. However, phased array antennas may be more difficult to stow and package in the small mass and volume required for the satellite 200, as discussed above. A reflector antenna has the advantage of being able to operate over a broad frequency range unlike phased arrays, which are limited by side lobes created by element spacing. Additionally, reflector antennas are also lighter, less expensive, easier to stow in a smaller volume, and require less power and less thermal control. Thus, example embodiments of the high efficiency synthetic aperture radar satellite 200 include a parabolic reflector antenna 206. The physical dimensions of the antenna 206 determine the swath of the antenna, which is the area imaged on the surface of the Earth via a radio-frequency pulse emitted from the antenna 206. In various embodiments, the radar is side looking, and the coverage of the Earth by the antenna is a product of the swath coupled with other factors such as altitude and inclination.

In various embodiments, the satellite 200 includes a stowing mechanism that provides for stowing of the antenna in a compact configuration, so as to decrease volume and size of the satellite 200 during launch. The satellite may also include a release mechanism that expands the antenna 206 from a stowed position into an operational position in a manner that minimally perturbs the satellite or does not perturb the satellite an unrecoverable amount. Various embodiments may employ several different stowing mechanisms. In some embodiments, stowing mechanism includes an antenna having antenna ribs that wrap around each other in a flexible manner, stowing downwards. In some embodiments, the stowing mechanism may also include truss structures stowed in a tight cylinder formation. Other embodiments may include unfurlable deployment, rolled up flexible phased arrays, hinged and stowed phased arrays, and foldable phased arrays. In an example embodiment, the high efficiency synthetic aperture radar satellite 200 includes an antenna that includes antenna ribs capable of folding around a central hub in order to stow compactly.

In various embodiments, reflector antenna systems utilize a "feed" source from which the radio-frequency signal is transmitted and received, and one or more reflectors to focus the radio-frequency signal to achieve gain. Physical optics techniques are utilized in creating reflector antenna configurations. Various embodiments may utilize different deployed antenna configurations in addition to different stowed configurations. FIGS. 3-6 illustrate examples of various embodiments of high efficiency synthetic aperture radar systems with different deployed antenna configurations.

Figure 3:
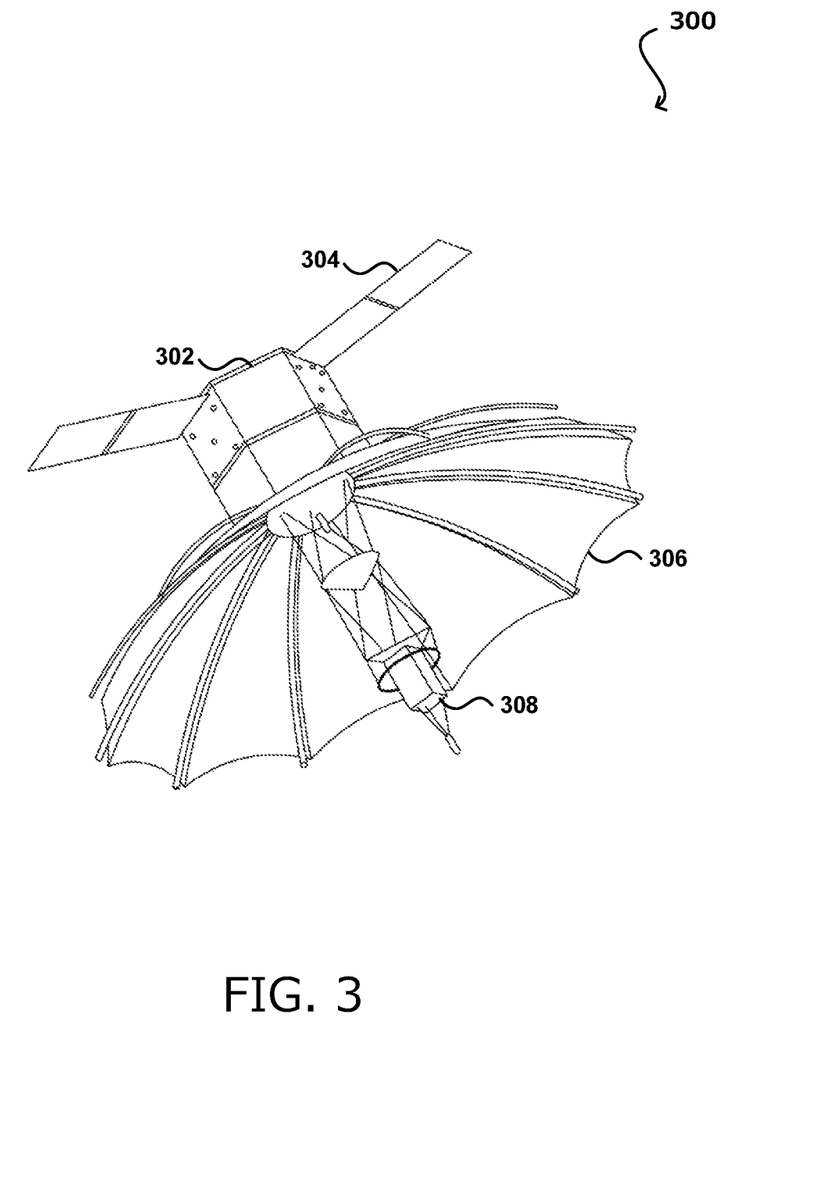
FIG. 3 illustrates an example representation of a radar satellite with a center-fed, Cassegrain reflector, in accordance with various embodiments of the present disclosure.

FIG. 3 illustrates an example representation of a high efficiency synthetic aperture radar satellite 300 with a center fed Cassegrain reflector, in accordance with various embodiments. In this example embodiment, the satellite 300 includes a satellite bus 302, solar panels 304, a center-fed reflector antenna 306, and Cassegrain sub-reflector and feed assembly 308.

Figure 4:
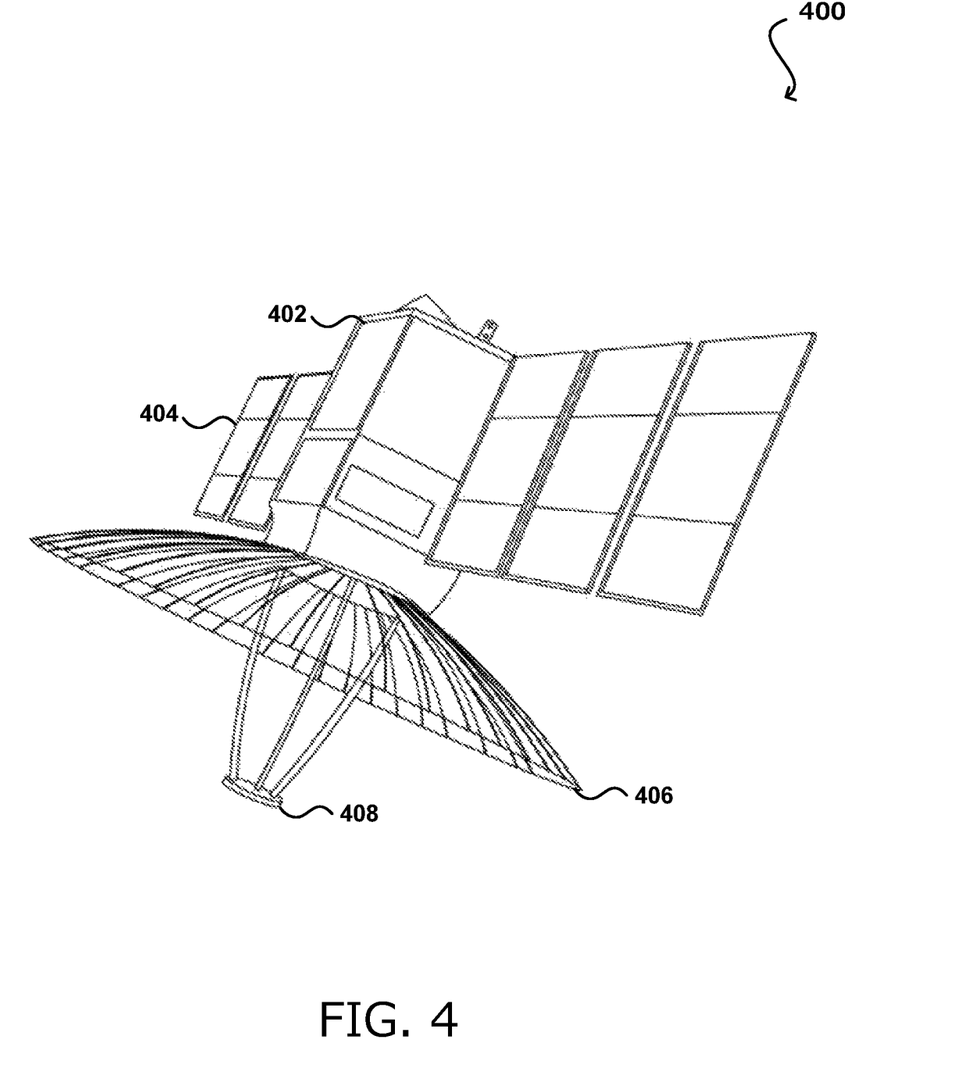
FIG. 4 illustrates an example representation of a radar satellite with a center, direct-fed reflector, in accordance with various embodiments of the present disclosure.

FIG. 4 illustrates an example representation of a high efficiency synthetic aperture radar satellite 400 with a center, direct fed reflector, in accordance with various embodiments. A direct and center fed reflector includes a feed that is supported away from and facing the main reflector, aligned with the center point of the main reflector, and positioned at the focal point. In this example embodiment, the satellite 400 includes a satellite bus 402, solar panels 404, a center-fed reflector antenna 406, and a direct feed 408.

Figure 5:
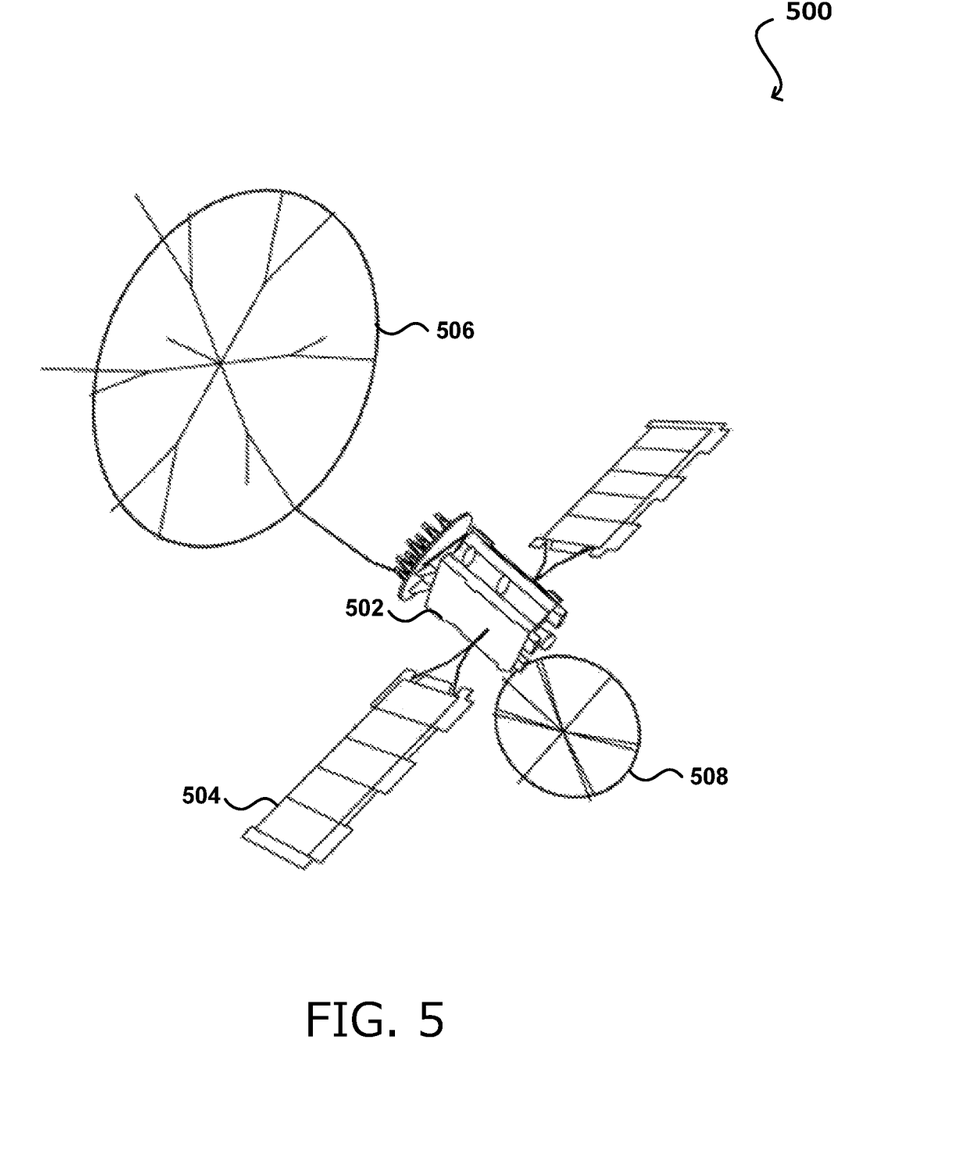
FIG. 5 illustrates an example representation of a radar satellite with an offset-fed, boom deployed reflector, in accordance with various embodiments of the present disclosure.

FIG. 5 illustrates an example representation of a high efficiency synthetic aperture radar satellite 500 with an offset fed, boom deployed reflector, in accordance with various embodiments. An offset fed reflector includes a feed held away from the main reflector, facing off-center from the main reflector's focal point. In this example embodiment, the satellite 500 includes a satellite bus 502, solar panels 504, and an offset feed, boom deployed antenna reflector 506.

Figure 6:
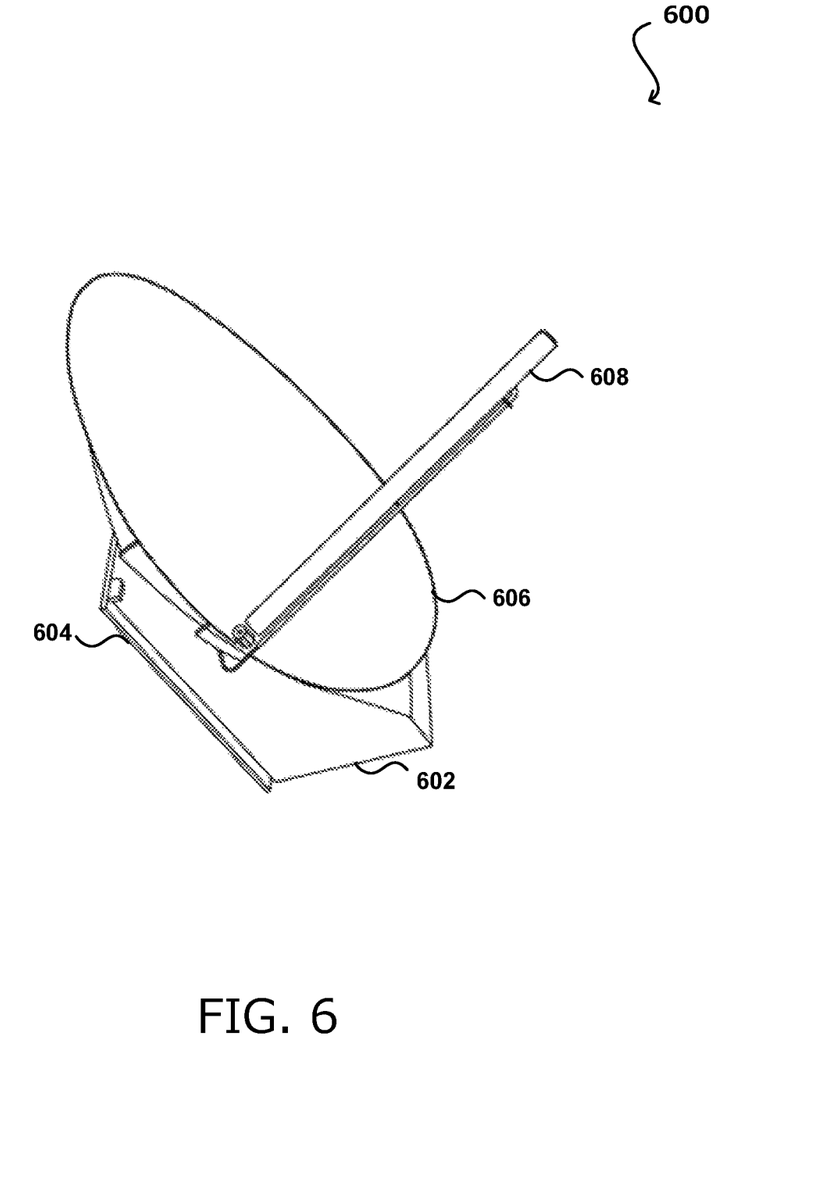
FIG. 6 illustrates an example representation of a radar satellite with an offset-fed reflector, in accordance with various embodiments of the present disclosure.

FIG. 6 illustrates an example representation of a high efficiency synthetic aperture radar satellite 600 with an offset fed reflector, in accordance with various embodiments. In this example embodiment, the satellite 600 includes a satellite bus 602, solar panels 604, offset fed antenna reflector 606, and an offset feed 608.

Figure 7:
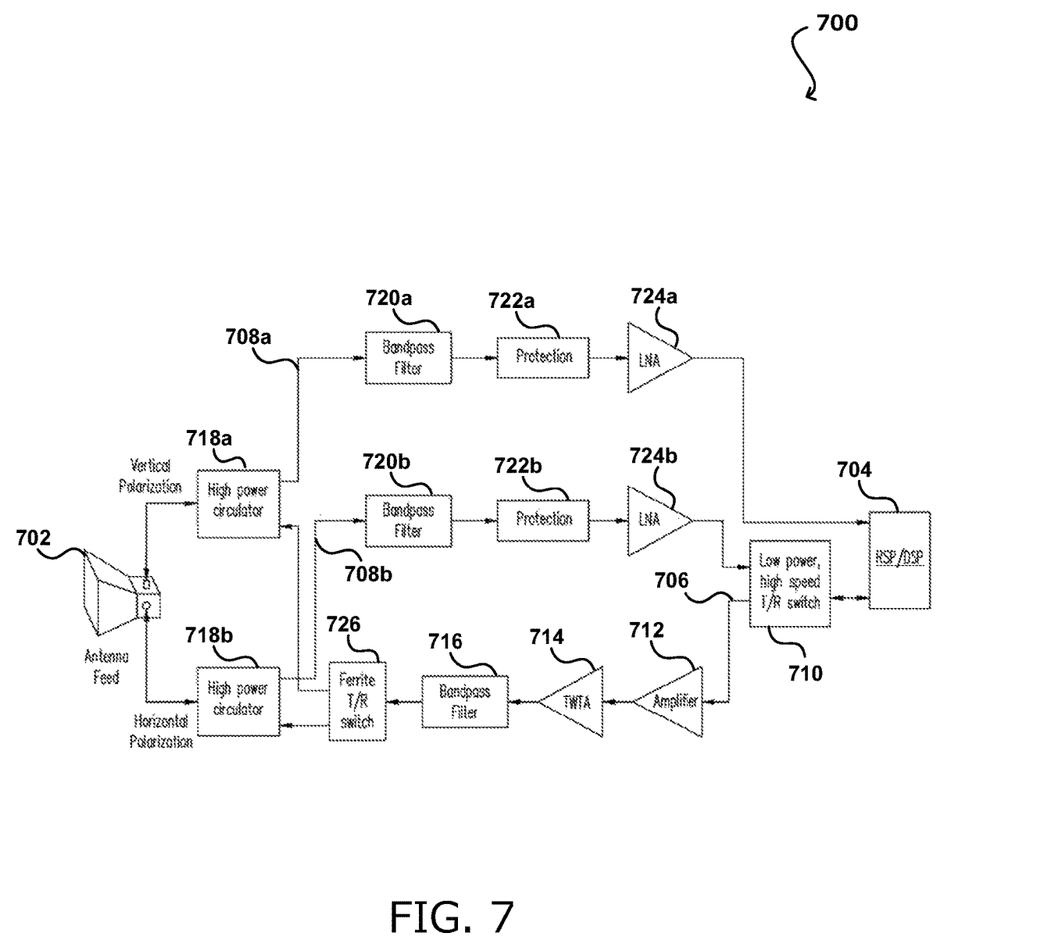
FIG. 7 illustrates an example block diagram of a radar for high efficiency synthetic aperture radar imaging, in accordance with various embodiments of the present disclosure.

FIG. 7 illustrates an example block diagram 700 of a payload configuration for high efficiency synthetic aperture radar imaging, in accordance with various embodiments. The radar generates low power complex wave form, the power is increased, and it is then transmitted from the antenna towards a region of interest. Part of the signal is reflected from the regions of interest in the direction of the radar where it is detected and processed into digital data which is then used analysis of various parameters of the regions of interest.

Specifically, in various embodiments, the payload circuitry includes transmission circuitry 706 integrated with receiving circuitry 708. For example, the payload 700 includes an antenna feed 702 and a signal processor 704. The antenna feed 702 may include a dual polarization and high power feed horn, and the signal processor 704 may include a radar signal processor and/or a digital signal processor. In various embodiments, the transmission signal is generated via the signal processor 704, such as by an signal generator, and processed for transmission output at the antenna feed 702 via the transmission circuitry 706, and the received reflection signals are received by the antenna feed 702 and pre-processed as input to the signal processor 704 via the receiving circuitry 708. A transmit/receive switch 710 can switch the communication direction between the antenna feed 702 and the signal processor 704. The transmission circuitry 706 may include one or more amplifiers for amplifying the signal generated at the signal processor. The amplifiers may include a medium power amplifier 712 and a traveling wave tube amplifier (TWTA) 714. The amplified signal may be processed through a bandpass filter 716 and two high power circulators 718a, 718b. A first circulator 718a processes the signal for vertical polarization and a second circulator 718b processes the signal for horizontal polarization. In some embodiments, a transmit/receive switch 726 further controls the signal direction with respect to the circulators 718a, 718b.

In various embodiments, the receiving circuitry 706 for receiving reflection signals (i.e., echoes) includes circuitry for respective vertical polarization and horizontal polarization components, including circulators 718a, 718, bandpass filters 720a, 720b, protective current limiters 722a, 722b, and low noise amplifiers (LNA) 724a, 724b. The received signals may be pre-processed through these example components before reaching the signal processor, where the signals are processed, such as combined, to generate image data.

Figure 8:
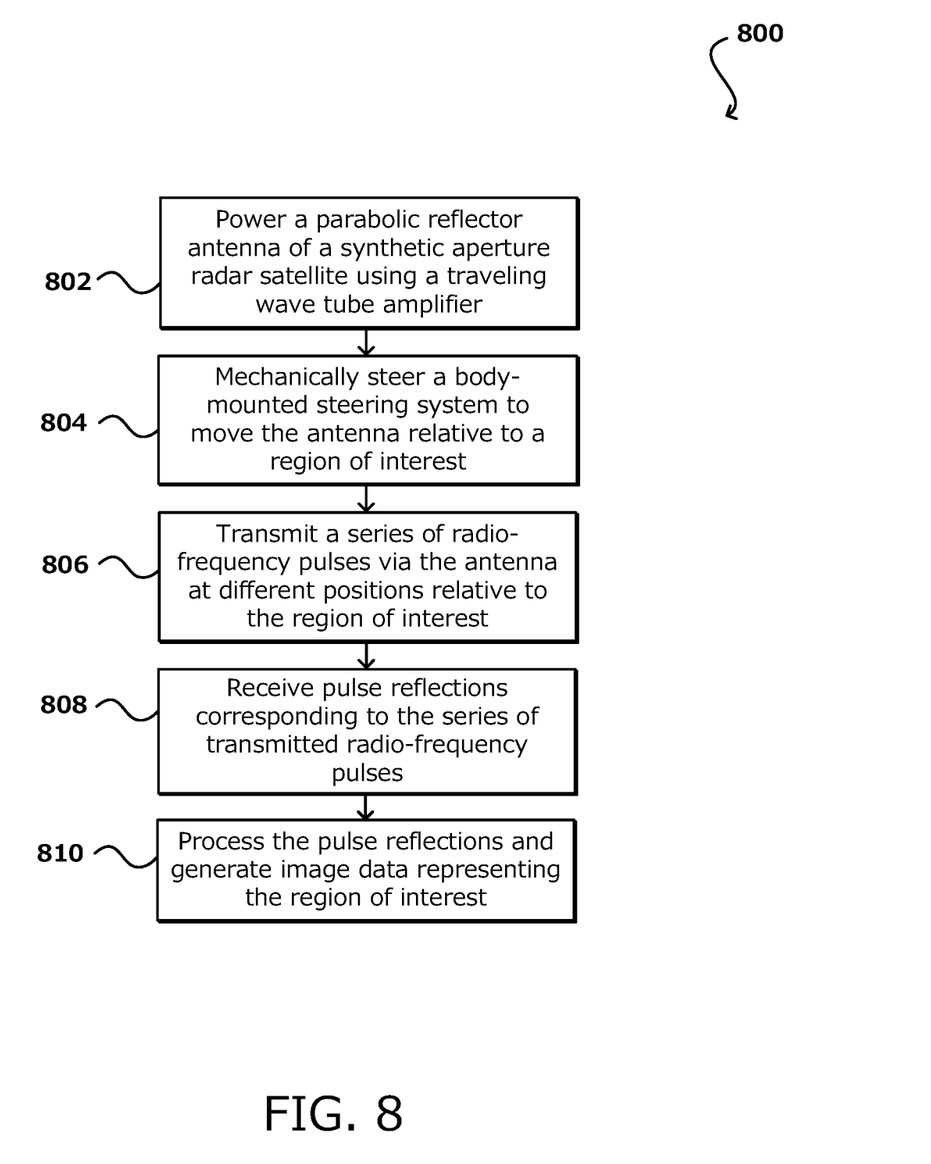
FIG. 8 illustrates an example process for performing high efficiency synthetic aperture radar imaging, in accordance with various embodiments of the present disclosure.

FIG. 8 illustrates an example process for performing high efficiency synthetic aperture radar imaging, in accordance with various embodiments. It should be understood that, for any process discussed herein, there can be additional, fewer, or alternative steps performed in similar or alternative orders, or in parallel, within the scope of the various embodiments. In this example, a parabolic reflector antenna of a synthetic aperture radar satellite is powered 802 using a traveling wave tube amplifier. The satellite includes a body-mounted steering system and the body-mounted steering system is steered 804 mechanically to move (e.g., direct) the antenna relative to a region of interest, during which a series of radio-frequency pulses is transmitted 806 via the antenna at different positions relative to a region of interest, such as along a flight path, as illustrated in FIG. 1. In some embodiments, lower power complex waveforms are generated and transmitted via the antenna. Reflection signals (i.e., echoes) corresponding to the series of transmitted radio-frequency pulses are received 808 at the antenna, and the reflection signals are processed (e.g., combined) 810 to generate image data representing the region of interest. In some embodiments, the antenna may first be expanded from a stowed position into an operational position. In certain such embodiments, the antenna may comprise a plurality of antenna ribs foldable around a central hub in the stowed position.

Figure 9:
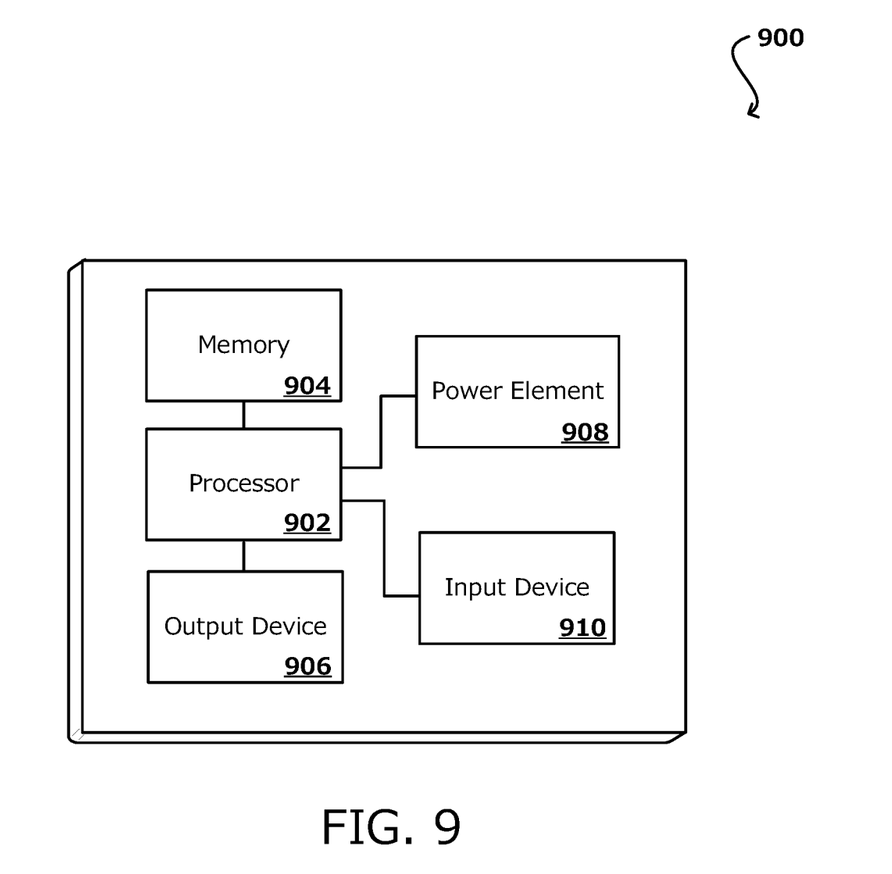
FIG. 9 illustrates an example system diagram, in accordance with various embodiments of the present disclosure.

In various embodiments, the high efficiency synthetic aperture radar system described above may include or be communicative with a computing system for carrying out various data processing functions, among other functions. Different approaches can be implemented in various environments in accordance with the described embodiments. For example, FIG. 9 illustrates a set of basic components of an example computing system 900 that can be utilized to implement aspects of the various embodiments. In this example, the device includes at least one processor 902 for executing instructions that can be stored in a memory device or element 904. As would be apparent to one of ordinary skill in the art, the device can include many types of memory, data storage or computer-readable media, such as a first data storage for program instructions for execution by the at least one processor 902, the same or separate storage can be used for images or data, and telemetry and communication interfaces to control and communicate with the satellite from the Earth. The communications interfaces may include an output device 906 and an input device 910 for transmitting and receiving various data and communications. In some embodiments, the output device 906 and the input device 910 may be integrated as a single device. Protocols and components for communications interfaces and communications networks are well known and will not be discussed herein in detail. The system may further include a power element 908, such as an input for receiving power from a power source and providing power to other electrically powered components.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A radar satellite system, comprising:
    a satellite bus;
    a parabolic reflector antenna coupled to the satellite bus, the parabolic reflector antenna comprising a central hub and a plurality of antenna ribs movable from a stowed position to an operational position, the antenna ribs foldable around the central hub in the stowed position and expandable into a parabolic reflector configuration in the operational position, wherein the antenna is configured to transmit a series of pulses from different positions over a region of interest and receive a corresponding series of pulse reflections, and wherein the parabolic reflector antenna has a power aperture factor to mass ratio of at least 600 kilowatts-meter squared per kilogram;
    a traveling wave tube amplifier configured to drive the parabolic reflector antenna;
    a body-mounted steering system configured to mechanically steer the satellite system to direct the parabolic reflector antenna; and
    a processor configured to combine the pulse reflections and generate image data representing the region of interest, the image data associated with a synthetic aperture greater than the antenna aperture.

2. The radar satellite system of claim 1, wherein the parabolic reflector antenna further comprises a feed source from which radio-frequency signals are transmitted and received, the feed source including a center feed at positioned at the center of the reflector antenna and a Cassegrain hyperbolic reflector positioned at the focal point of the parabolic reflector antenna.

3. The radar satellite system of claim 1, wherein the body-mounted steering system comprises an actuation system comprising a control moment gyroscope.

4. The radar satellite system of claim 1, wherein the satellite bus has a mass less than 150 kilograms.

5. The radar satellite system of claim 4, wherein the parabolic reflector antenna has an antenna aperture size to satellite mass ratio of at least 0.10 square meters per kilogram.

6. A radar satellite system, comprising:
    a satellite having a satellite mass, the satellite comprising:
        a satellite bus; and
        an antenna expandable from a stowed position into an operational position, the antenna having an antenna aperture size, the antenna aperture size and the satellite mass having a ratio of at least 0.03 meters squared per kilogram, wherein the antenna is configured to transmit a series of pulses from different positions over a region of interest and receive a corresponding series of pulse reflections, wherein the antenna has a power aperture factor to mass ratio of at least 600 kilowatts-meter squared per kilogram; and
    a processor configured to combine the pulse reflections and generate image data representing the region of interest, the image data associated with a synthetic aperture greater than the antenna aperture.

7. The radar satellite system of claim 6, wherein the satellite mass is less than 150 kilograms.

8. The radar satellite system of claim 6, wherein the antenna is a parabolic reflector antenna or a phased array antenna.

9. The radar satellite system of claim 6, wherein the antenna comprises a central hub and a plurality of antenna ribs, the antenna ribs foldable around the central hub in the stowed position and expandable into a parabolic reflector configuration in the operational position.

10. The radar satellite system of claim 6, wherein the antenna comprises at least one of: a plurality of antenna ribs configured to wrap around each other in the stowed positioned, truss structures stowable in a cylinder formation, flexible phased arrays stowable in a rolled configuration, phased arrays stowable in a hinged position, or foldable phased arrays.

11. The radar satellite system of claim 6, wherein the antenna comprises a main reflector and a feed source, the feed source including at least one of an offset fed reflector facing off-center from main reflector's focal point, a direct and center fed reflector aligned with the main reflector's center point and at the main reflector's focal point, or a center feed at positioned at the main reflectors center with a Cassegrain hyperbolic reflector positioned at the main reflector's focal point.

12. The radar satellite system of claim 6, further comprising:
    an amplifier configured to drive the antenna, the amplifier comprising a traveling wave tube amplifier or a solid state power amplifier.

13. The radar satellite system of claim 6, further comprising:
    a body-mounted steering system configured to direct the antenna by moving the satellite through mechanical steering.

14. The radar satellite system of claim 13, wherein the body-mounted steering system comprises an actuator system, the actuator system comprising a control moment gyroscope.

15. A satellite imaging method, comprising:
    powering a parabolic reflector antenna of a synthetic aperture radar satellite using a traveling wave tube amplifier, wherein the parabolic reflector antenna has a power aperture factor to mass ratio of at least 600 kilowatts-meter squared per kilogram;
    mechanically steering a body-mounted steering system to move the antenna relative to a region of interest;
    transmitting a series of radio-frequency pulses via the antenna at different positions relative to a region of interest;
    receiving pulse reflections corresponding to the series of transmitted radio-frequency pulses; and
    processing the pulse reflections and generate image data representing the region of interest.

16. The radar satellite system of claim 15, further comprising:

expanding the antenna from a stowed position into an operational position, wherein the antenna comprises a plurality of antenna ribs foldable around a central hub in the stowed position.

17. The radar satellite system of claim 15, further comprising:
generating low power complex waveforms for transmission by the antenna.

18. The radar satellite system of claim 15, wherein the synthetic aperture radar satellite has a mass less than 150 kilograms.

19. The radar satellite system of claim 18, wherein the synthetic aperture radar satellite has an antenna aperture size to satellite mass ratio of at least 0.03 meters squared per kilogram.

20. The radar satellite system of claim 15, wherein the parabolic reflector antenna further comprises a feed source from which radio-frequency signals are transmitted and received, the feed source including a center feed at positioned at the center of the reflector antenna and a Cassegrain hyperbolic reflector positioned at the focal point of the parabolic reflector antenna.

\* \* \* \* \*